(12) United States Patent
Huan et al.

(10) Patent No.: US 8,073,277 B2
(45) Date of Patent: Dec. 6, 2011

(54) APPARATUS AND METHODS FOR IMAGE RESTORATION

(75) Inventors: Xiaoli Huan, Pace, FL (US); Beddhu Murali, Petal, MS (US); Adel L. Ali, Hattiesburg, MS (US)

(73) Assignee: The University of Southern Mississippi, Hattiesburg, MS (US)

( * ) Notice: Subject to any disclaimer, the term of this patent is extended or adjusted under 35 U.S.C. 154(b) by 1141 days.

(21) Appl. No.: 11/812,814

(22) Filed: Jun. 21, 2007

(65) Prior Publication Data

US 2008/0317375 A1      Dec. 25, 2008

(51) Int. Cl.
*G06K 9/40* (2006.01)
(52) U.S. Cl. ........ 382/254; 382/260; 382/236; 382/187; 382/181; 382/166; 600/407; 348/607; 345/422
(58) Field of Classification Search .................. None
See application file for complete search history.

(56) References Cited

U.S. PATENT DOCUMENTS

| | | | | |
|---|---|---|---|---|
| 5,420,966 A | * | 5/1995 | Silverbrook | 345/422 |
| 5,598,226 A | * | 1/1997 | Kokaram | 348/607 |
| 6,252,974 B1 | * | 6/2001 | Martens et al. | 382/107 |
| 6,633,683 B1 | * | 10/2003 | Dinh et al. | 382/260 |
| 6,741,738 B2 | * | 5/2004 | Taylor | 382/187 |
| 6,987,520 B2 | | 1/2006 | Criminisi et al. | |
| 2001/0033688 A1 | * | 10/2001 | Taylor | 382/181 |
| 2002/0136453 A1 | * | 9/2002 | Aggarwal et al. | 382/166 |
| 2003/0144585 A1 | * | 7/2003 | Kaufman et al. | 600/407 |
| 2005/0069207 A1 | * | 3/2005 | Zakrzewski et al. | 382/190 |
| 2005/0238199 A1 | * | 10/2005 | Nevis et al. | 382/103 |
| 2008/0159639 A1 | * | 7/2008 | Dvir et al. | 382/236 |
| 2008/0298680 A1 | * | 12/2008 | Miller et al. | 382/168 |

OTHER PUBLICATIONS

Hamilton Chong "Image Inpainting and Texture Synthesis"; pp. 1-7 http://www.people.fas.harvard.edu/~hchong/Spring2002/cs276r/; last visited Apr. 24, 2007.
Hitoshi Yamauchi et al. "Image Restoration Using Multiresolution Texture Synthesis and Image Inpainting" Max-Planck-Institute fur Informatik, Saarbrucken, Germany; 7 pages.
R. Malladi et al. "Level Set and Fast Marching Methods in Image Processing and Computer Vision" Dept. of Mathematics, University of California, Berkeley 94720; pp. 489-492; 1996 IEEE.

(Continued)

*Primary Examiner* — Anand Bhatnagar
*Assistant Examiner* — Tsung-Yin Tsai
(74) *Attorney, Agent, or Firm* — Novak Druce+Quigg LLP

(57) ABSTRACT

The present invention relates to an apparatus and methods for performing image restoration. More specifically, the present invention relates to an apparatus and methods which are capable of quickly restoring various sizes of selected areas of an image. In one embodiment, a user may select or mark a target region in an image which is to be restored. A source window may then be generated and a pixel from within the target region may be selected for restoration. The intensity distribution of pixels surrounding the selected pixel may be compared with other pixels in the image and a pixel to be used for restoration of the selected pixel may be chosen based on the comparison of the intensity distributions. Once a pixel is chosen for restoration, the selected pixel and its surrounding pixels may be restored using the intensity distribution of the chosen pixel and its surrounding pixels. The method may continue in this manner until all pixels within the target region have been restored.

25 Claims, 7 Drawing Sheets

OTHER PUBLICATIONS

Alexandru Telea "An Image Inpainting Technique Based on the Fast Marching Method" J.of Graphics Tools, vol. 9, No. 1 pp. 25-36, 2003.

Li-Yi-Wei et al. "Fast Texture Synthesis Using Tree-Structured Vector Quantization"; Stanford University, Gates Computer Science Building, Stanford CA, 94305; 10 pages.

Marcelo Bertalmio et al. "Image Inpainting" Electrical and Computer Engineering, University of Minnesota, Minneapolis, MN 55455; 8 pages.

Manuel M. Oliveira et al. "Fast Digital Image Inpainting" Department of Computer Science State Univ. of New York at Stony Brook, Proceedings of the International Confer. on Visualization, Imaging and Image Processing (VIIP2001) Spain, Sep. 3-5, 2001.

J. A. Sethian "A Fast Marching Level Set Method for Monotonically Advancing Fronts" PNAS 1996, 93; 1591-1595.

Alexei A. Efros et al. "Texture Synthesis by Non-Parametric Sampling" IEEE International Conference on Computer Vision, Corfu, Greece, Sep. 1999; 6 pages.

* cited by examiner

APPARATUS AND METHODS FOR IMAGE RESTORATION

FIELD OF THE INVENTION

The present invention relates to an apparatus and methods for performing image restoration. More specifically, the present invention relates to an apparatus and methods which are capable of quickly restoring various sizes of selected areas of an image.

BACKGROUND OF THE INVENTION

Generally, the processes of image inpainting, image restoration and texture synthesis are used for changing an image so the change is typically not noticeable by an observer. In most processes, the selection of a region which is to be changed must first be selected. Next, color/intensity information from a suitably chosen neighborhood in the image outside the selected region may be propagated into the selected region to alter the selected region.

In the past, these processes were performed by skilled artists for the restoration of damaged paintings. More recently, the processes are being implemented in algorithms which may be used to edit, repair or correct scanned or digital images. For example, an individual may desire to remove red eyes from a digital photograph or may wish to hide blemishes, scratches or stains which may appear in a scanned image. Further, an individual may wish to remove an undesirable portion of an image.

However, many of the previous image inpainting, image restoration and texture synthesis algorithms are limited as far as the type of region which may be selected or by the size of the region which may be selected. For example, one previous algorithm operates by clearing all the color information in the selected region and then repeatedly uses color/intensity information from pixels adjacent to the selected region to diffuse known image information into the pixels in the selected region. However, this algorithm results in a blurry finished product unless a user manually selects a small image area (no thicker than 10-15 pixels).

While some previous algorithms are capable of processing larger image areas, they are typically quite slow and thus are incapable of processing the selected region at real-time, or even near real-time, speed. For example, one previous algorithm creates two separate functions to represent the selected image, processes the two functions separately and then sums the functions to arrive at the final image. The processing in this technique requires the steps of image decomposition, partial differential equation ("PDE") based image inpainting and multi-level texture synthesis. As a result, the algorithm requires approximately 5-10 minutes to process a selected region which covers only 4-6% of the pixels in the original image.

Thus, there is a need for an algorithm which is capable of quickly restoring various sizes of selected areas of an image.

SUMMARY OF THE INVENTION

The present invention relates to an apparatus and methods for performing image restoration. More specifically, the present invention relates to an apparatus and methods which are capable of quickly restoring various sizes of selected areas of an image.

One embodiment of the present invention includes a method. The method may comprise the steps of receiving an image having at least one marked region, each marked region of the image having a plurality of pixels, generating a source window, the source window enclosing at least one of the marked regions of the image and selecting a pixel from within one of the at least one marked regions enclosed by the source window. The method may also include the steps of generating a fill window around the selected pixel, generating a search window around each pixel outside the at least one marked region of the image and inside the source window, each search window having approximately the same size as the fill window, comparing the intensity distribution of at least a portion of the fill window with the intensity distribution of the corresponding portion of each search window; selecting a search window based on the comparison of the intensity distribution of the fill window with the intensity distribution of each search window and filling at least a portion of the pixels in the fill window with corresponding pixels in the selected search window.

Another embodiment of the present invention may include a computer program product, stored on a computer-readable medium, which may comprise computer program code for instructing a computer to perform a method. The method may comprise the steps of receiving an image having at least one marked region, each marked region of the image having a plurality of pixels, generating a source window, the source window enclosing at least one of the marked regions of the image and selecting a pixel from within one of the at least one marked regions enclosed by the source window. The method may also comprise the steps of generating a fill window around the selected pixel, generating a search window around each pixel outside the at least one marked region of the image and inside the source window, each search window having approximately the same size as the fill window, comparing the intensity distribution of at least a portion of the fill window with the intensity distribution of the corresponding portion of each search window, selecting a search window based on the comparison of the intensity distribution of the fill window with the intensity distribution of each search window and filling at least a portion of the pixels in the fill window with corresponding pixels in the selected search window.

These and other objects and advantages of the invention will be apparent from the following description, the accompanying drawings and the appended claims.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

The present disclosure will now be described more fully with reference to the Figures in which various embodiments of the present invention are shown. The subject matter of this disclosure may, however, be embodied in many different forms and should not be construed as being limited to the embodiments set forth herein.

As mentioned above, the present invention relates to an apparatus and methods for image restoration. For simplicity purposes, the principles of the present invention are described generally with respect to images. However, one of ordinary skill in the art will realize that this is not intended to be limiting and that the present invention may be utilized for the restoration of a variety of types of images including, but not limited to, grey scale images, color images, pseudo-color images, range images, x-ray images, scanned photographs, scanned documents, and individual frames of video.

Additionally, while the principles of the present invention are described generally with respect to image restoration, this is not intended to be limiting. It is contemplated that the present invention may be used for altering any type of image including, but not limited to, image interpolation, photograph restoration, object removal, image zooming, super-resolution, region-based image and video compression coding, error concealment of wireless image transmission or motion synthesis.

Figure 1:
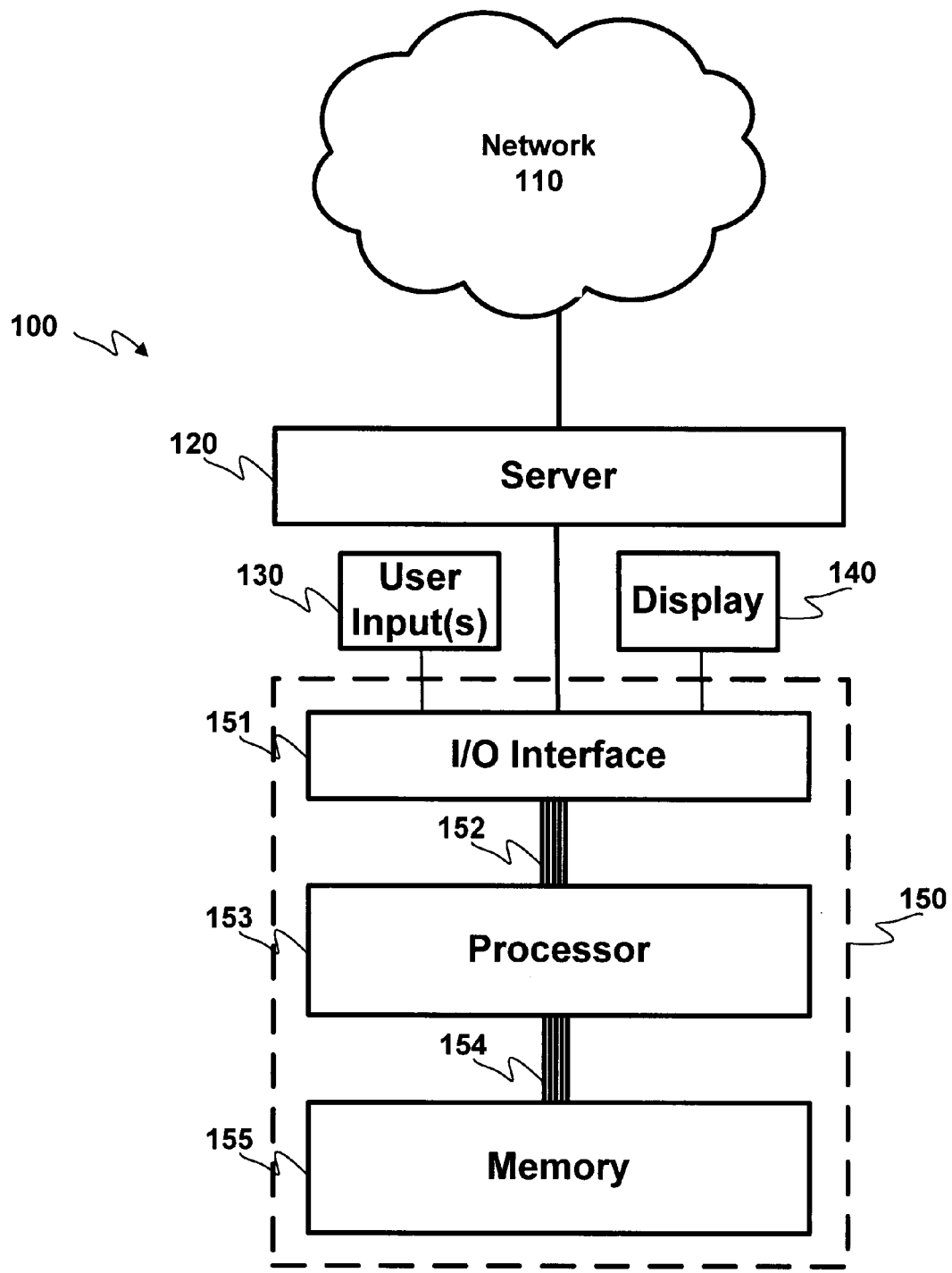
FIG. 1 illustrates an apparatus 100 according to one embodiment of the present invention.

FIG. 1 illustrates an apparatus 100 according to one embodiment of the present invention. As illustrated in FIG. 1, the present invention may include a processor-based system 150, one or more inputs 130 and a display 140. In one embodiment, the processor-based system 150 may include an input/output ("I/O") interface 151. In alternative embodiments, various I/O interfaces may be used as I/O interface 151 as long as the functionality of the present invention is retained.

The I/O interface 151 may be coupled to one or more input devices 130 including, but not limited to, user input devices such as a computer mouse, a keyboard, a touch-screen, a trackball, a microphone (for a processor-based system having speech recognition capabilities), a bar-code or other type of scanner, or any of a number of other input devices capable of permitting input to be entered into the processor-based system 150.

The I/O interface 151 may also be coupled to at least one display 140 for displaying information to a user of the processor-based system 150. Numerous types of displays may be used in connection with the present invention depending on the type information to be displayed. In one embodiment, display 140 may be a monitor, such as an LCD display or a cathode ray tube ("CRT"). Alternatively, the display may be a touch-screen display, an electroluminescent display or any other display that may be configured to display information to a user of processor-based system 150.

The I/O interface 151 may be coupled to a processor 153 via a bus 152. The processor 153 may be any type of processor configured to execute one or more application programs, for example. As used herein, the term application program is intended to have its broadest meaning and should include any type of software. Moreover, numerous applications are possible and the present invention is not intended to be limited by the type of application programs being executed or run by processor 153.

Further, processor 153 may be coupled to a memory 155 via a bus 154. Memory 155 may be any type of a memory device including, but not limited to, volatile or non-volatile processor-readable media such as any magnetic, solid-state or optical storage media. Processor 153 may be configured to execute software code stored on memory 155 including software code for performing the functions of the processor 153. According to one embodiment of the present invention, memory 155 includes software code, which may be read by the processor, for instructing the processor 153 to execute the image restoration process discussed in detail below with reference to FIGS. 2A to 3D.

The I/O interface 151 may also be coupled to a server 120 for connecting the processor-based system 150 to a network 110. In one embodiment, the server 120 may take the form of a separate computer, or multiple computers, connected to the processor-based system 150 via a local or public network. In alternative embodiments, the server may be an integral part of processor-based system 150, with both the processor-based system 150 and the server 120 existing, for example, in a single personal computer.

In one embodiment of the present invention, software code for instructing the processor 153 to execute the image restoration process discussed in detail below may be stored on the server 120 or may be provided over the network 110. Accordingly, in one embodiment of the present invention, processor-based system 150 may be used to access the software code from the server 120 or network 110. In alternative embodiments, additional processor-based systems (not shown) may be able to access the software code via the network 110 or server 120 to execute the image restoration process discussed in detail below.

Figure 2A:
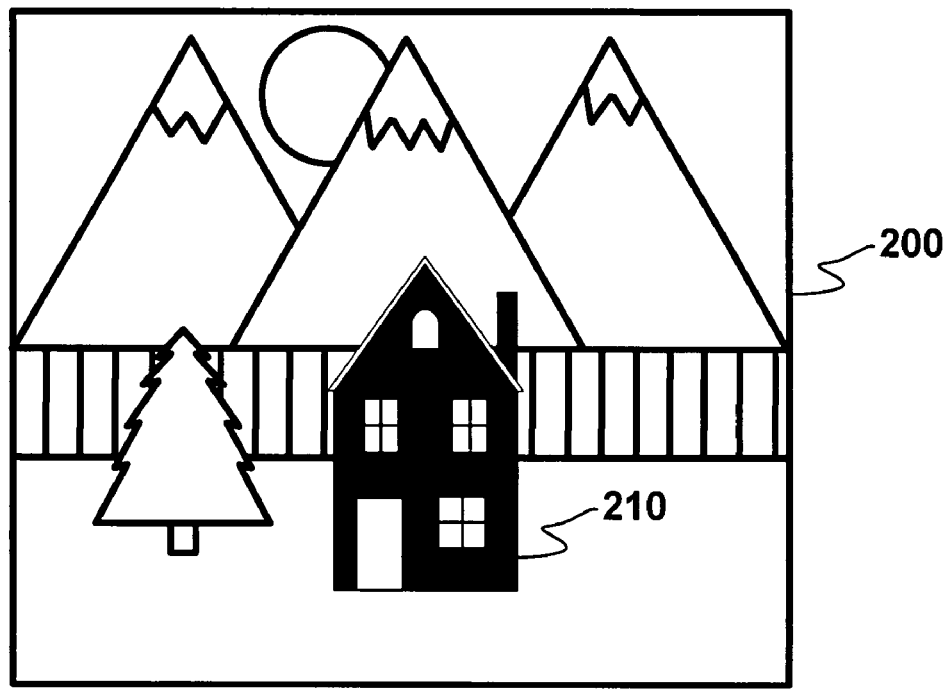
FIGS. 2A-2C generally illustrate a method for image restoration according to one embodiment of the present invention.
Figure 2B:
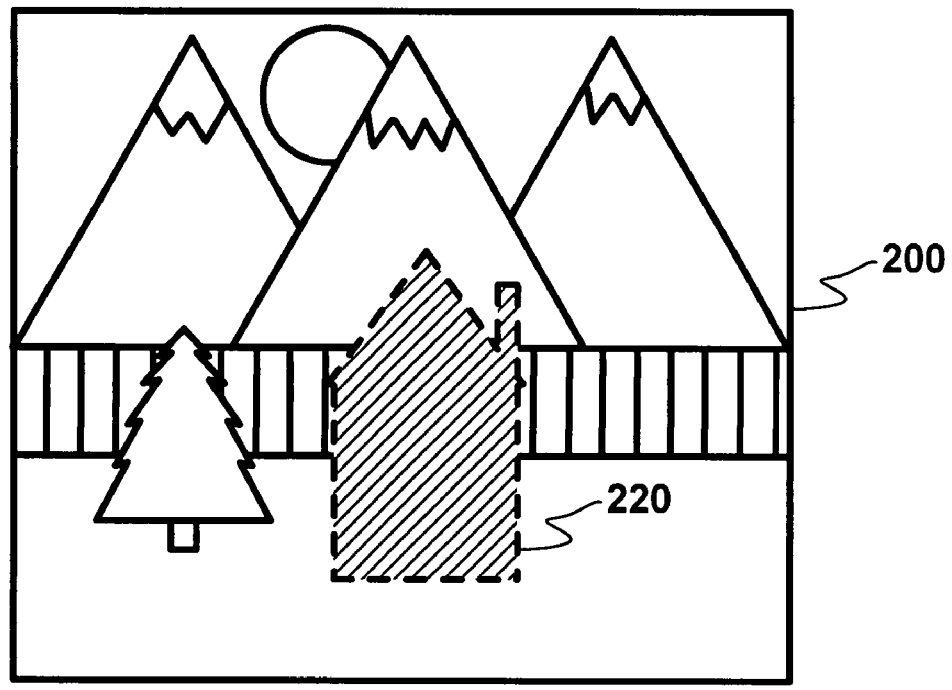
Figure 2C:
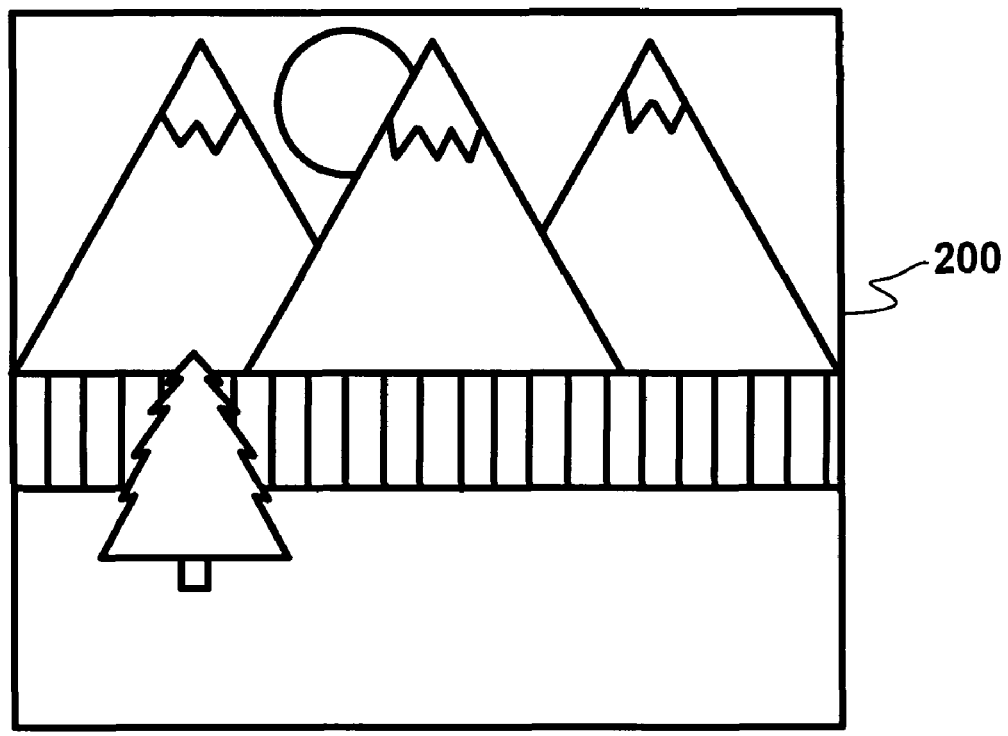

FIGS. 2A-2C generally illustrate a method for image restoration according to one embodiment of the present invention. FIG. 2A illustrates a fictional digital image 200 of a landscape pictured behind a house 210. It should be noted that the particular objects in image 200 are not intended to be limiting. One of ordinary skill in the art will realize that it is within the scope and spirit of the present invention for an image 200 to be restored to include images of any objects, including living or inanimate objects, or combinations of both living and inanimate objects. Accordingly, it should be realized that the method for image restoration according to the present invention may be used for restoring or removing unwanted portions of any object in any image.

According to one embodiment of the present invention, if a user desires to remove a portion of the image 200 in FIG. 2A, the user would first select or mark the portion of the image which he or she desires to remove. For example, if the user desires to remove the house 210 from image 200, the user may select or mark the house 210 as a target region for removal and restoration. The user may select or mark the target region using one or more user inputs 130 including, but not limited to, a mouse or a trackball for outlining the target region. As shown by the shaded area with a dashed outline in FIG. 2B, the user has marked a target region 220 which includes the area which originally included the house 210.

While, for simplicity, the description herein discusses and illustrates the use of only one target region in an image, it is contemplated that multiple target regions may also be restored simultaneously. As will be realized by one of ordinary skill in the art, this will involve only routine modification of the description herein and will involve the same image restoration process. For example, where multiple target regions are selected, a source window (as discussed in detail below) may be generated to encompass all of the target regions. However, it is also contemplated that multiple source windows may be generated where, for example, the target regions are located a large distance away from each other in the original image.

Once a user has selected an appropriate target region or regions for removal and restoration, the method for image restoration according to the present invention (discussed in detail below with respect to FIGS. 3A to 3D) may then be performed on the image to remove the target region or regions. As illustrated in FIG. 2C, once the method for image restoration is complete, the portion of the image 200 that is included in target region 220 may be reconstructed based on other portions of the image 200. The house 210 in the original image 200 is no longer visible after restoration, having been replaced by the landscape, fence, and mountain that was not present in the target region of the original image 200.

FIGS. 3A-3D illustrate a method for image restoration according to the present invention. As mentioned above, the methods of the present invention may be used to provide an intensity value, a vector of color values for color images or a brightness value for grey-scale images, for every pixel within a selected region of an image by obtaining the intensity information from other non-selected regions in the image.

Figure 3A:
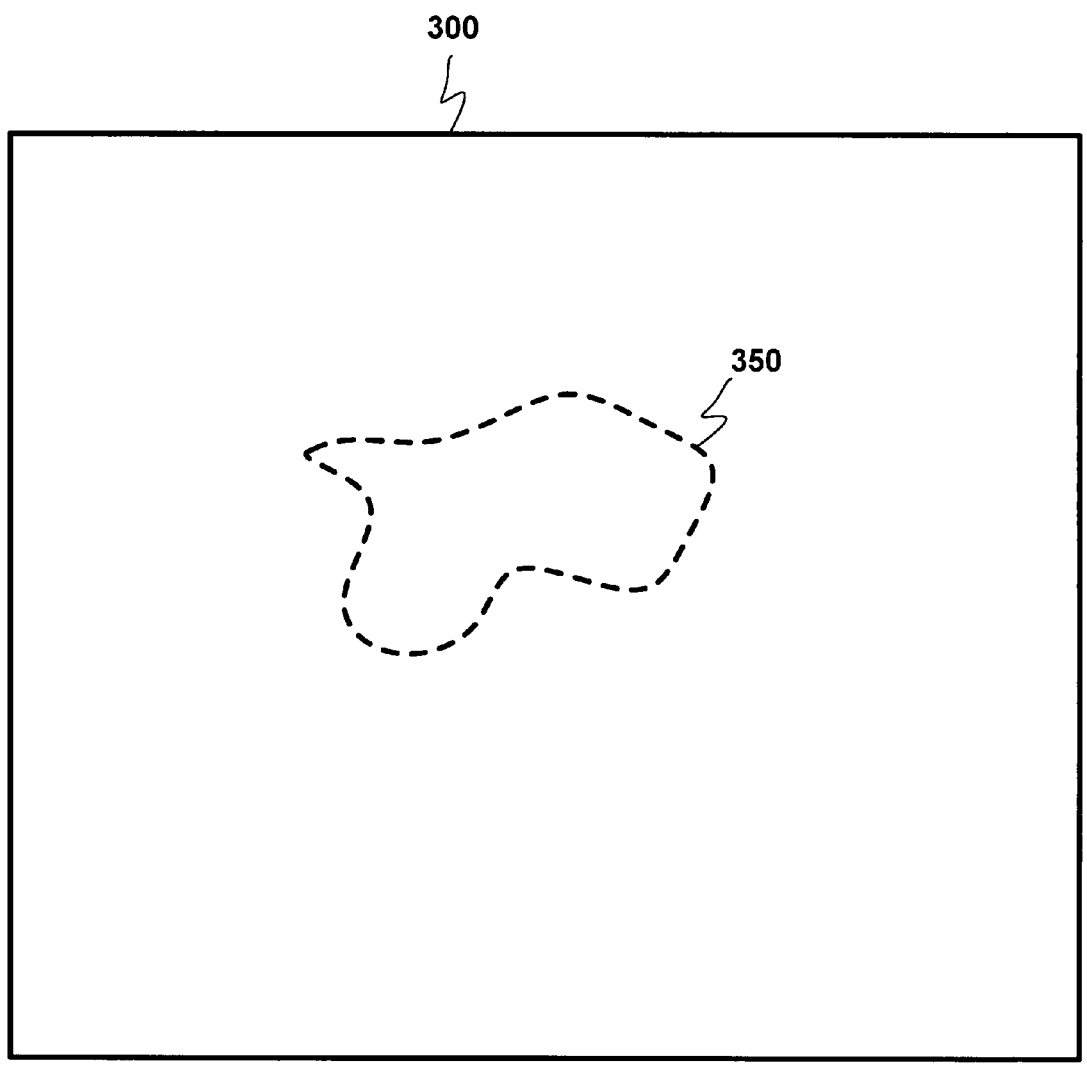
FIGS. 3A-3D illustrate a method for image restoration according to one embodiment of the present invention.

As shown in FIG. 3A, a user may select a target region 350 in an image 300 for image restoration. As discussed above with regard to FIGS. 2A to 2C, the user may select the target region 350 using one or more user inputs 130. While not illustrated in FIG. 3A, image 300 may comprise a plurality of pixels, as will be readily apparent to one of ordinary skill in the art. Further, the selected target region 350 will also comprise a plurality of the pixels from the image 300. Thus, once a target region is selected 350, there will be a plurality of pixels from the image 300 which are within the target region 350 and there will be a plurality of pixels from the image 300 which are outside the target region 350.

In one embodiment of the present invention, a user may input an offset number of pixels using one or more of the user inputs 130 prior to the execution of the image restoration method. In other embodiments, the offset number of pixels may be preset as a default. In any case, the offset number of pixels may be used to generate a source window 310 around the target region 350, as discussed below.

The source window 310 is generated by first selecting a pixel within the target region 350. According to one embodiment of the present invention, the pixel may be the first pixel chosen after the sorting process described below. According to other embodiments of the present invention, however, the pixel used for generating the source window may be selected based on its location within the target region 350 (for example, at or near the center of the target region) or may be an arbitrary pixel chosen from within the target region.

Figure 3B:
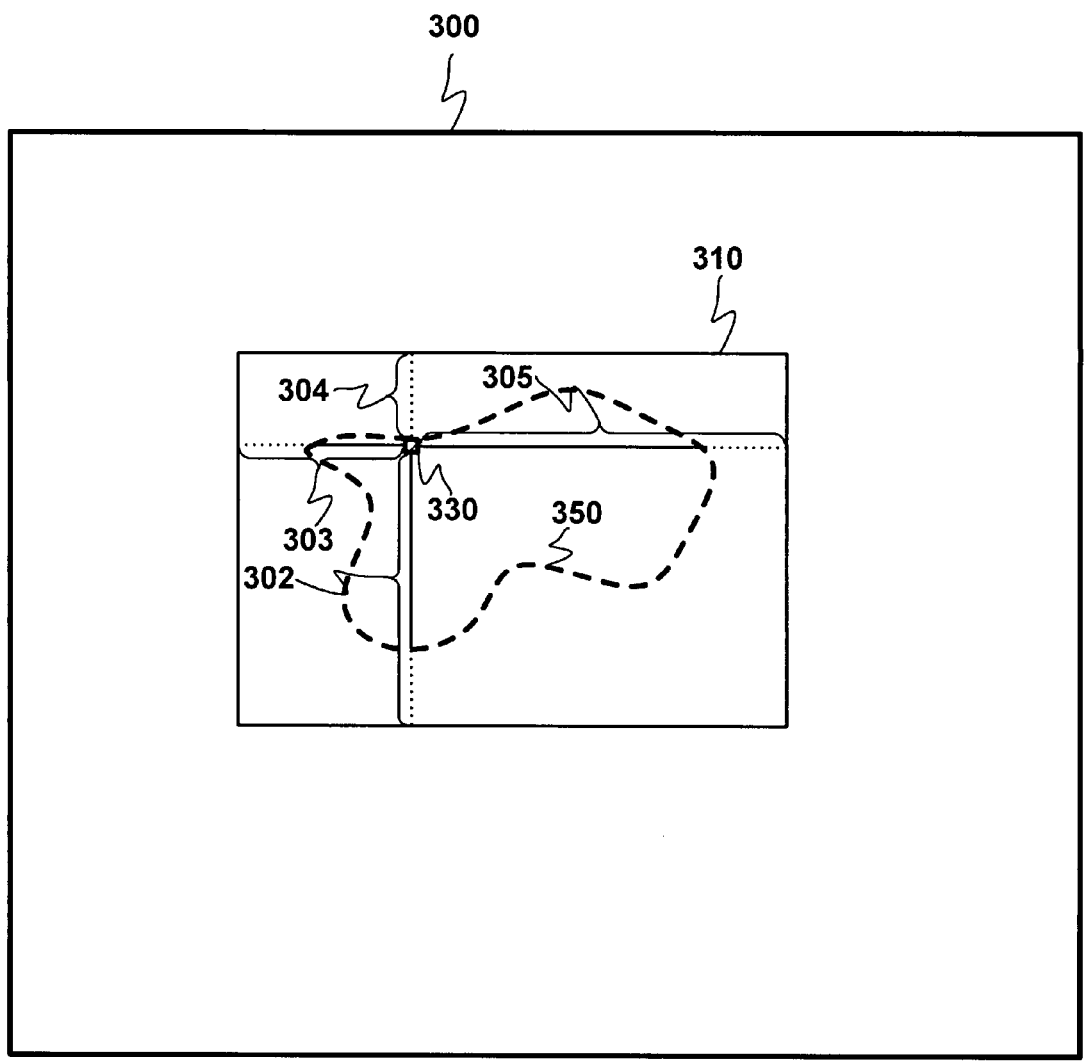

In FIG. 3B, pixel 330 is used to illustrate the generation of the source window. For illustrative purposes, we will assume that pixel 330 is selected because it is the first pixel chosen after the sorting process based on time of arrival discussed in detail below. As illustrated in FIG. 3B, the source window is generated by moving left, right, up and down from the chosen pixel 330 until the edge of the target region 350 is encountered (illustrated by the solid portion of lines 302, 303, 304 and 305 in FIG. 3B). From the edge of the target region, the number of offset pixels may be added (illustrated by the dotted portion of lines 302, 303, 304 and 305 in FIG. 3B) in all four Cartesian directions to create four points which may be used to generate the source window 310, as shown in FIG. 3B.

In alternative embodiments, a user may select a source window 310 manually by highlighting an area around the target region 350 using one or more of the user inputs 130. This may be accomplished using any conventional method known to one of skill in the art including, but not limited to, clicking and dragging or selecting corners to create a rectangular area.

As will be appreciated by one of ordinary skill in the art, there are several problems in physics and engineering which involve the motion of either a curve (in two dimensions) or a surface (in three dimensions) where motion occurs along the local normal. Prior publications have also used the term "front" to denote a curve or a surface. As will be realized by one of ordinary skill in the art, if the velocity of motion doesn't change its sign at any time during computation, the curve may either expand or contract at the same speed at every point along the curve. One may use the Eikonal equation, as known to one of skill in the art, to compute the "time of arrival" of this moving curve at a point that is away from the curve. One method known in the art for solving the Eikonal equation using computer processing is known as the "fast marching method."

In such problems, the initial shape of the curve is typically known. For example, the contour of the outer edge of the target region 350 in the present invention may be known to a user. At every point along the initial shape of the curve, the time may be set to be zero. The given domain may then be divided into horizontal and vertical grid lines, similar to the arrangement of pixels in a typical digital image. The goal of the fast marching method is to find the next grid point that is not already on the front at which the front may arrive the earliest. As mentioned above, the location of this point may depend upon the local speed of the front. Once such a point is found, that point may now become a part of the new front and this procedure may be repeated until the front reaches all points in the direction of motion.

In the present invention, once a target region 350 is selected and a source window 310 is generated, then, following the fast marching method discussed above, the contour of the outer edge of the target region 350 may be represented as a level set function T, which may initially be assigned a value of zero. The function T is also known as the arrival time function or time of arrival function. The time of arrival function T in the interior of the target region 350 may then be obtained by solving the Eikonal equation:

$$F\sqrt{T_x^2+T_y^2}=1 \qquad \text{Equation (1)}$$

Where F is a user-specified speed function, and Tx and Ty denote partial derivatives of T with respect to x and y respectively. Several user-specified speed functions will be known to those having ordinary skill in the art. For example, the speed function F may be a constant value speed function or a speed function that is proportional to the negative exponential of the image gradient magnitude. However, the use of an alternative speed function is within the scope and spirit of the present invention and should not be limited to the examples provided herein.

As discussed above, in order to inpaint a region of interest, the fast marching method may first be used to computer the arrival time of the front. The computation of arrival time alone, however, does not provide the intensity values which may be used to fill the region. As mentioned above, the level set function may be used to determine the fill order in which pixels within the target region 350 are to be restored. As will be apparent to one of ordinary skill in the art, as the Eikonal equation is solved, the outer boundary of the target region 350 will move inward at a rate which is dependent upon the gradient of the image intensity at the boundary of the target region 350. Thus, the shrinking curve, or the "advancing front," may arrive at different pixels within the target region 350 at different relative times. The time of arrival function T may provide the relative time at which the shrinking curve may arrive at each interior pixel. It should be noted that, depending on the speed function F used, it may be possible for the shrinking curve to arrive at different interior pixels at the same relative time.

Once the relative arrival time for each pixel within the target region 350 is determined by solving the Eikonal equation using an image gradient based speed function F, the pixels within the target region 350 may be sorted into a fill order based on their arrival time. In one embodiment of the present invention, the pixels may be sorted in order of increasing arrival time. Thus, the pixels with the lowest arrival time (i.e., the pixels which are closest to the boundary of the target region 350) will be first in the order.

Because some of the pixels may be assigned the same arrival time, an additional sorting of those pixels may be performed. According to one embodiment of the present invention, the additional sorting of the pixels may be accomplished by calculating the number of known neighboring pixels in a specified area around each pixel (i.e., the number of pixels in the specified area which are not inside of the shrinking target region 350). The specified area around each pixel used to calculate the number of known neighbors may be determined based on a predefined boundary (for example, a search box of a given size may be set as a default). In other embodiments, however, this area may be determined using the offset in the same manner in which the source window is generated below. In other embodiments, a different predetermined offset may be provided. In any case, the pixels which have the same arrival time may then be further sorted based on the greatest number of known neighboring pixels. Thus, after the sorting process is complete, all of the pixels within the target region 350 may be sorted based on the lowest relative arrival time and, for any pixels having the same arrival time, further sorted based on the largest number of known neighboring pixels.

Once the user has selected the target region 350, the source window 310 has been generated and the fill order has been determined, the method may proceed with restoration of the target region 350. As mentioned above, the fill order may be used to determine the order in which the pixels are to be restored according to the present invention. Thus, the pixel with the lowest relative arrival time will be restored first, the pixel with the next lowest arrival time will be restored second, and so on until the final remaining pixel in the target region has been restored.

Figure 3C:
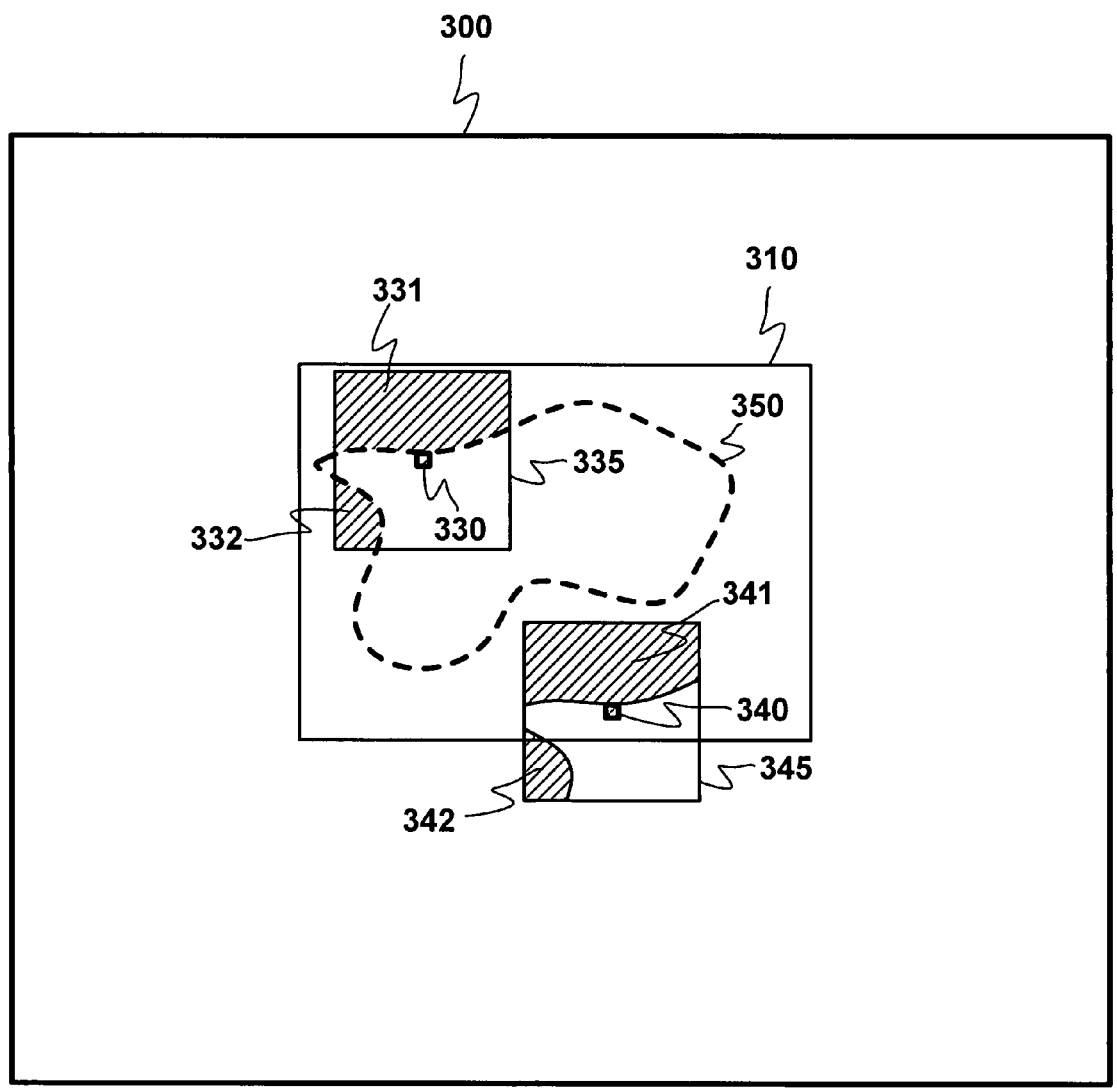

FIG. 3C illustrates the restoration of a single pixel according to one embodiment of the present invention. As mentioned above, we will assume that pixel 330 has been selected because it is the pixel within the target region 350 having the lowest relative arrival time. A source window 310 has been generated using a pixel offset, as discussed above. Next, a fill window 335 may be generated around the selected pixel 330, as illustrated in FIG. 3C. In one embodiment of the present invention, a user may input the size of the fill window 335. In other embodiments, the size of the fill window 335 may be preset as a default.

Once the fill window 335 has been generated, the restoration method according to the present invention may then look at other pixels in the image which may be used to provide the intensity information for restoring each pixel in the target region 350. As illustrated in FIG. 3C, this may first involve determining which pixels in the fill window 335 for the selected pixel 330 are known pixels (that is, the pixels which are not within the target region 350). In FIG. 3C, the known pixels in fill window 335 are illustrated as shaded areas 331 and 332.

Next, the restoration method according to the present invention may compare the intensity of the known pixels in the fill window with the intensity of other portions of the image. This may be accomplished by looking at each pixel which is within the source window 310 but which is outside of the target region 350. A search window having substantially the same size as the fill window may be generated around each pixel which is within the source window 310 but which is outside of the target region 350. The Sum of Squared Differences ("SSD") may then be calculated, as explained in detail below, using the pixels in each source window which correspond to the known pixels in the fill window.

The SSD may be calculated using the following Equation:

$$d_{SSD}=\Sigma(P-P')^2 \qquad \text{Equation (2)}$$

where P is the intensity of the known pixels in the fill window and P' is the intensity of the corresponding pixels in the search window. The summation may be taken over all the known pixels in the fill window. It is important to note that P' may only include known pixels that correspond to the known pixels in the fill window. This means that any pixels that are in the search window which are also within the target region 350 will be excluded from the SSD calculation.

In an alternative embodiment, the sum of absolute differences ("SAD") may be calculated in lieu of Equation 2. The SAD may be calculated using the following Equation:

$$d_{SAD}=\Sigma|P-P'| \qquad \text{Equation (3)}$$

where the summation is defined to be the same as the summation in Equation (2).

The pixel within the source window 310, but outside the target region 350, having the search window with the lowest SSD or SAD calculation may then be chosen as the pixel to be used for restoration of the selected pixel within the target region 350. This process is illustrated in FIG. 3C. If two pixels have the same SSD or SAD calculation, both pixels may be used for the restoration of the selected pixel within the target region 350.

In FIG. 3C, once the fill window 335 has been generated and the known pixels (illustrated as shaded areas 331 and 332) within the fill window 335 are determined, the method of the present invention may then look at each pixel within the source window 310, but outside the target region 350. As discussed above, a search window may be generated around each of these pixels and an SSD calculation may be performed. We will assume that pixel 340, having corresponding search window 345, is determined to have the lowest SSD calculation out of all the other pixels within the source window 310 with respect to selected pixel 330. Therefore, the intensity information for pixel 340 and search window 345 may be selected to be used for the restoration of pixel 330.

Once a pixel and its corresponding search window is chosen based on its SSD value, the intensity information for that pixel and corresponding search window may be used to restore the selected pixel and known pixels within the fill window. The intensity value of the currently chosen pixel may be set equal to the corresponding value from the chosen search window. For all of the originally known pixels in the fill window, the new intensity of the pixel may be an average of its original intensity and the intensity of its corresponding pixel in the chosen search window. In one embodiment, the average may be calculated using a simple arithmetic average of the two values, as will be known to one of ordinary skill in the art. In other embodiments, a weighted average (where the weighting is done in favor of the existing pixel value) may also be used, as will be known to one of ordinary skill in the art.

To continue with the example illustrated in FIG. 3C, when pixel 340 and its corresponding search window 345 are chosen, they may then be used to restore selected pixel 330 and the known pixels in fill window 330 as discussed above. As such, the new intensity value for each of the originally known pixels in shaded areas 331 and 332 in fill window 335 may be an average of their original intensity value and the intensity value of the corresponding pixels in the chosen search window 345 (illustrated as shaded areas 341 and 342). Further, the intensity of pixel 330 may be replaced with the intensity value of chosen pixel 340.

Once the first pixel in the fill order has been restored, the same process may then be repeated for the next pixel in the fill order until all of the pixels from within the originally selected target region 350 have been restored. As mentioned above, as the pixels within the target region 350 are restored, the boundary of the target region 350 may shrink so that it only includes the originally selected pixels which have not yet been restored. In other words, once a pixel is restored, it may be removed from the target region.

Figure 3D:
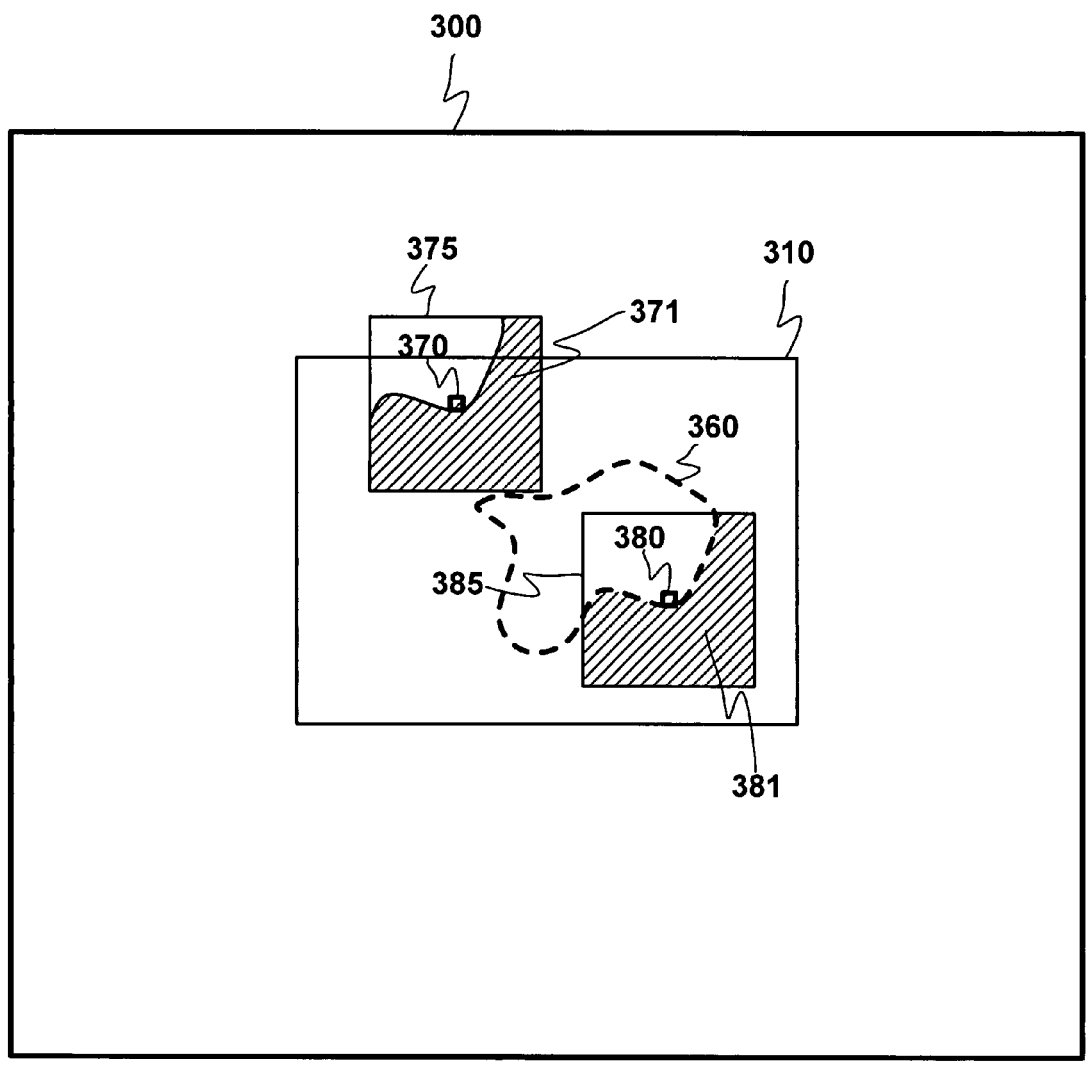

This is illustrated in FIG. 3D, where a new target region 360, having a smaller size than original target region 350, is illustrated. While the source window 310 may remain the same size, as illustrated in FIG. 3D, it is contemplated that, in one embodiment, the size of the source window may change each time the boundary of the target region is altered. Thus, it is contemplated that a new source window may be created, as described above, after the restoration of each pixel within the target region is completed.

In the example illustrated in FIG. 3D, we will assume that, of the remaining selected pixels in the target region 360, pixel 380 is the lowest in the previously calculated fill order. Thus, the restoration process discussed above may be performed for pixel 380. Therefore, a fill window 385 may be generated around pixel 380. Further, the SSD for the search windows corresponding to each pixel within the source window 310, but outside the target region 360, may be calculated.

If we assume that pixel 370, having corresponding search window 375, has the lowest SSD value of the other known pixels and their search windows in the source window 310, pixel 370 may be used to restore pixel 380. Thus, the intensity of the known pixels in the search window 375 (illustrated by shaded area 371) which correspond to the known pixels in the fill window 385 (illustrated by shaded area 381) may be averaged together as discussed above. Further, the intensity of pixel 370 may be used as the intensity of pixel 380.

As mentioned above, the restoration method of the present invention may continue in the manner described with reference to FIGS. 3A-3D until all of the pixels in the target region have been restored. As will be realized by one of ordinary skill in the art, the present invention therefore allows for the restoration of any size target region without significant image quality degradation. This is due at least to the fact that the present invention does not rely on diffusing intensity information from pixels located only at the boundary of the target region but, rather, analyzes the intensity information of a larger portion of the original image.

Additionally, the present invention allows for faster image restoration than previous methods for image restoration. This is due at least to the fact that the present invention does not rely on iteration to assess whether the intensity information used for restoration of each pixel is accurate. Further, the method of the present invention does not require the solving of partial differential equations during restoration because SSD or SAD metrics may be implemented using integer arithmetic alone.

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. While the embodiments were chosen and described in order to best explain the principles of the invention and its practical applications, thereby enabling others skilled in the art to best utilize the invention, various embodiments with various modifications as are suited to the particular use are also possible. The scope of the invention is to be defined only by the claims appended hereto, and by their equivalents.

What is claimed is:

1. A method comprising the steps of:
receiving an image having at least one marked region, each marked region of the image having a plurality of pixels;
generating a source window, the source window enclosing at least one of the marked regions of the image;
selecting a pixel from within one of the at least one marked regions enclosed by the source window;
generating a fill window around the selected pixel;
generating at least one search window around each pixel outside the at least one marked region of the image and inside the source window, each at least one search window having approximately the same size as the fill window;
comparing the intensity distribution of at least a portion of the fill window with the intensity distribution of the corresponding portion of each at least one search window;
selecting at least one search window from among the generated at least one search window based on the comparison of the intensity distribution of the fill window with the intensity distribution of each at least one search window;
filling at least a portion of the pixels in the fill window with corresponding pixels in the selected at least one search window;
wherein the selected pixel is selected based on a fill order; and
wherein the fill order is determined by a time of arrival computation using the Eikonal equation initialized with the contour of the edges of the originally received at least one marked region and a prescribed speed function based on image intensity gradient.

2. The method of claim 1, wherein the step of filling includes filling the selected pixel with a corresponding pixel in the selected search window.

3. The method of claim 1, further comprising the step of removing the selected pixel from the at least one marked region, thereby shrinking the size of the at least one marked region.

4. The method of claim 1, wherein the at least one marked region is marked by a user.

5. The method of claim 1, wherein a single source window is generated enclosing all of the marked regions of the image.

6. The method of claim 1, wherein a number of generated source windows is different from a number of marked regions.

7. The method of claim 1, wherein the steps of selecting a pixel, generating a fill window, generating a search window, comparing the intensity, selecting a search window and filling are performed for each pixel in the at least one marked region of the image.

8. The method of claim 1, wherein the selected pixel is selected based on a fill order.

9. The method of claim 1, wherein for pixels having the same computed time of arrival, the fill order is further determined based on the number of known pixels in the fill window such that a pixel having a higher number of known pixels in the fill window is filled first.

10. The method of claim 1, wherein the size of the fill window and the search windows are based on a first parameter.

11. The method of claim 10, wherein the first parameter is a window size selected by a user.

12. The method of claim 1, wherein the size of the source window is based on a second parameter.

13. The method of claim 12, wherein the second parameter is an offset number of pixels selected by a user.

14. The method of claim 1, wherein the step of comparing the intensity distribution of the fill window with the intensity distribution of each search window is performed by calculating the sum of the squared differences of the intensities of the pixels in the fill window and the corresponding pixels in each search window.

15. The method of claim 14, wherein the step of selecting a search window includes the step of selecting the search window having the smallest sum of the squared differences of the intensities of the pixels in the fill window and the corresponding pixels in the search window.

16. The method of claim 1, wherein the step of comparing the intensity distribution of the fill window with the intensity distribution of each search window is performed by calculating the sum of the absolute differences of the intensities of the pixels in the fill window and the corresponding pixels in each search window.

17. The method of claim 16, wherein the step of selecting a search window includes the step of selecting the search window having the smallest sum of the absolute differences of the intensities of the pixels in the fill window and the corresponding pixels in the search window.

18. The method of claim 1, wherein the image is a digital image.

19. The method of claim 1, wherein the image is a frame of a video.

20. The method of claim 1, wherein the image is a photograph.

21. The method of claim 1, wherein the method is used for image restoration.

22. The method of claim 1, wherein the image is used for the removal of a portion of an image.

23. The method of claim 1, wherein the step of filling comprises averaging the intensity distribution of each pixel in the unmarked regions of the fill window with the intensity distribution of the corresponding regions in the selected search window.

24. The method of claim 1, wherein the step of filling comprises the step of replacing the intensity distribution in the unmarked regions of the fill window with the intensity distribution of the corresponding regions in the selected search window.

25. A computer program product, stored on a non-transitory computer-readable storage medium, comprising computer program code for instructing a computer to perform a method comprising the steps of:

receiving an image having at least one marked region, each marked region of the image having a plurality of pixels;

generating a source window, the source window enclosing at least one of the marked regions of the image;

selecting a pixel from within one of the at least one marked regions enclosed by the source window;

generating a fill window around the selected pixel;

generating at least one search window around each pixel outside the at least one marked region of the image and inside the source window, each at least one search window having approximately the same size as the fill window;

comparing the intensity distribution of at least a portion of the fill window with the intensity distribution of the corresponding portion of each at least one search window;

selecting at least one search window from among the generated at least one search window based on the comparison of the intensity distribution of the fill window with the intensity distribution of each at least one search window; and filling at least a portion of the pixels in the fill window with corresponding pixels in the selected at least one search window, wherein the selected pixel is selected based on a fill order; and wherein the fill order is determined by a time of arrival computation using the Eikonal equation initialized with the contour of the edges of the originally received at least one marked region and a prescribed speed function based on image intensity gradient.

* * * * *